D. N. WILD.
SPINDLE STEP BEARING.
APPLICATION FILED JUNE 28, 1909.

972,743.

Patented Oct. 11, 1910.

WITNESSES:
H. B. Burr
Hazle Fredin

INVENTOR
Daniel N. Wild
BY G. C. Kennedy
ATTORNEY

UNITED STATES PATENT OFFICE.

DANIEL N. WILD, OF CEDAR FALLS, IOWA.

SPINDLE STEP-BEARING.

972,743.  Specification of Letters Patent.  Patented Oct. 11, 1910.

Application filed June 28, 1909. Serial No. 504,883.

*To all whom it may concern:*

Be it known that I, DANIEL N. WILD, a citizen of the United States of America, and a resident of Cedar Falls, Blackhawk county, Iowa, have invented certain new and useful Improvements in Spindle Step-Bearings, of which the following is a specification.

Figure 1:
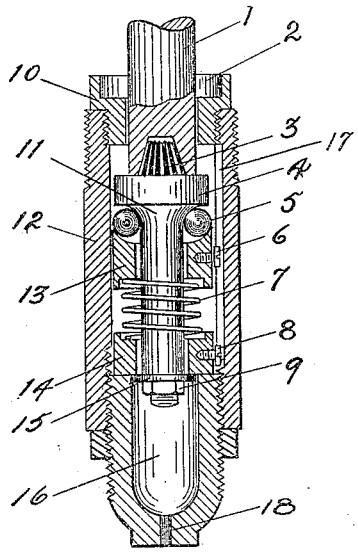
Figure 2:
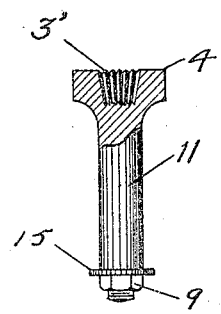

My invention relates to improvements in spindle step-bearings, and more specifically to bearings for the rotary spindles of centrifugal cream separator bowls, and the object of my improvement is to provide an improved resilient anti-friction step-bearing for that purpose. This object I have accomplished by the means which are hereinafter fully described and claimed, and which are illustrated in the accompanying drawings, in which:

Figure 1 is a central vertical section of the bushings of my improved bearing, showing the included resiliently-supported and anti-friction means for receiving the foot of a spindle. Fig. 2 is a detail view of one of the spindle-supports showing it formed with a slightly variant means of connection with the spindle-foot.

Similar numerals refer to similar parts throughout the several views.

The outer hollow cylindrical bushing 12 of my improved bearing is exteriorly threaded near its top, whereby it may be secured in the frame of a centrifugal machine. A hollow cylindrical nut 10 is seated in the open top of the bushing 12, and a hollow nut 16 is seated in the open bottom of said bushing. The inner bore of the nut 10 receives the spindle 1, the upper part of said nut being expanded to form an oil-cup 2. The nut 16 is adjustable vertically within the threaded lower end of the bushing 12, and has its base contracted and furnished with a drainage port 18 of small diameter. Within the bore of said bushing 12, and resting upon the top of the base-nut 16 is a cylindrical sleeve 14 whose axial bore is slightly wider than the diameter of the lower contracted end of the spindle-support 11 which passes through it. The lower end of the support 11 is further diminished and threaded to receive a washer 15 which bears against the lower surface of the sleeve 14 and a nut 9 which serves to secure said washer in place. Another hollow sleeve 13 is located within the bore of the bushing 12 above the sleeve 14 and spaced apart from the latter by means of a coiled compression-spring 7 whose ends are seated in cup-shaped hollows in the adjacent ends of said sleeves. The inner bore of the sleeve 13 is also slightly wider than the diameter of the received spindle-support 11. The upper end of the sleeve 13 has an axial convex seat or roll-way for a plurality of anti-friction balls 5 between which the body of the support 11 is received and engaged, while the support 11 is curved outward above and contacting with said balls to permit the expansion 4 to rest thereon and rotate thereover. The upper end of the support-expansion 4 has an axial boss 3 of the form of a frustum with grooved surface, and said frustum 3 is adapted to be received into an axial cavity or seat in the lower end of the spindle 1, the corrugations in said frustum serving to frictionally engage the walls of said seat to hold them together so that they may rotate as one. In Fig. 2 I have shown a slightly varied pattern of spindle-support, which, however, has in the top of its expansion 4 an axial cavity or seat 3' adapted to receive a boss on the end of a spindle supported thereon, and the walls of said cavity 3' are grooved to effect a frictional hold upon the spindle-boss.

It will be observed that the inner wall of the hollow bushing 12 is vertically grooved at 17, this groove 17 being adapted to receive and be a slideway for the heads of the screws 6 in the sleeve 13, and 8 in the sleeve 14, and serve to prevent the rotation in said bushing of said sleeves, which might otherwise be caused by the moving parts above the sleeves.

Among the useful features of my improved spindle-bearing are these. The vertical adjustment of the base-nut 16 to take up space occasioned by frictional wear upon the bearing-surface of the sleeve 13; yieldable resilient support to the spindle afforded by the seating of the spring 7 with its ends in engagement with the cupped adjacent ends of said sleeves; the improved spindle-support 11 with its expansion 4 carried on the anti-friction means 5 in the yieldable raceway of the sleeve 13, and the improved means of connection between the end of the spindle 1 and the spindle-support 11. These taken together, furnish a spindle supporting-means which is very efficient in steadying and supporting the spindle and its rapidly rotating superincumbent extensions. The washer 15 also, by reason of its engagement with the lower surface of the lower sleeve 14, renders it possible for the spindle-support 11 and said sleeves to be withdrawn from the bushing 12 together, when disassembling the bearing, as well as reintroducing said parts in assembling, which is a great convenience.

Having described my invention, what I claim as new, and desire to secure by Letters Patent, is:

1. A spindle step-bearing, comprising in combination, a bushing having a groove on its inner surface, a rotary spindle whose lower end extends into said bushing concentrically, a solid supporting-body detachably secured to the lower end of said spindle within said bushing, said supporting-body having a filleted expansion near its top, an annular element having a raceway located loosely about said supporting-body below its filleted expansion, anti-friction balls in said raceway and supporting said filleted expansion, means for preventing the rotation of said element consisting of a projection on the raceway element extending therefrom movably into said groove in said bushing, and means for resiliently upholding said element.

2. A spindle step-bearing, comprising, in combination, a hollow bushing, a spindle rotatable therein and spaced away therefrom, a spindle-support therein detachably engaged therewith to rotate therewith, said support having an annular expansion concentric with said spindle, also a concentric depending stem, a raceway sleeve about and spaced away from the said stem, anti-friction balls in said raceway supporting said annular expansion, a vertically-adjustable sleeve about said stem and spaced apart therefrom, a coiled compression-spring seated between said sleeves and engaged therewith, and means for preventing a horizontal rotation of both sleeves but permitting vertical movements thereof.

3. A spindle step-bearing, comprising, in combination, a hollow bushing, a rotary spindle therein, a hollow nut adjustably seated in the lower end of said bushing, a supporting-body for said spindle having a depending stem movable in the hollow of said bushing and extending into the hollow of said nut, a sleeve about said stem and upheld by said nut, resilient means interposed between said sleeve and said supporting body to resiliently and yieldingly support the latter to obviate sidewise oscillations thereof, and a washer removably secured on the lower end of the stem of said supporting-body below the lower surface of said sleeve.

4. A spindle step-bearing, comprising in combination, a hollow bushing, a rotary spindle dipping thereinto, a hollow nut seated adjustably in the lower end of said bushing, a supporting-body for said spindle having a solid depending stem movable in the hollow of said bushing and extending into the hollow of said nut, a sleeve seated loosely about said stem and supported on said nut between it and the said supporting-body, anti-friction means located between said supporting-body and said sleeve, and engaging-means removably secured to the lower end of the stem of said supporting-body below the lower end of said sleeve.

5. A spindle step-bearing, comprising in combination, a hollow bushing, a spindle rotatable therein and spaced away therefrom, a spindle-support therein detachably engaged with the spindle-end to rotate therewith, said support having a filleted expansion and a depending stem concentric with said spindle, a raceway sleeve about and spaced away from said stem, anti-friction means in said raceway supporting said filleted expansion, a vertically-adjustable sleeve about said stem and spaced apart therefrom, and resilient means yieldingly seated between said sleeves and engaged therewith.

Signed at Waterloo, Iowa, this 11th day of June, 1909.

DANIEL N. WILD.

Witnesses:
G. C. KENNEDY,
O. D. YOUNG.